United States Patent [19]

Kojima et al.

[11] 4,042,429

[45] Aug. 16, 1977

[54] MAGNETIC ALLOYS HAVING WASP-WAISTED MAGNETIC HYSTERESIS LOOP

[75] Inventors: Shigeru Kojima, Kyoto; Kiyoshi Kojima, Hirakata; Tadao Ohtani; Nobuyuki Kato, both of Katano; Yoichi Sakamoto, Hirakata; Isago Konno; Masaharu Tsukahara, both of Neyagawa; Takao Kubo, Kawachinagano, all of Japan

[73] Assignee: Matsushita Electric Industrial Co., Ltd., Osaka, Japan

[21] Appl. No.: 511,476

[22] Filed: Oct. 1, 1974

[30] Foreign Application Priority Data

Oct. 3, 1973 Japan ................................ 48-111804

[51] Int. Cl.[2] ........................ C04B 35/00; H01F 1/04; C22C 28/00

[52] U.S. Cl. .............................. 148/31.55; 75/134 M; 148/120; 148/121

[58] Field of Search ............ 75/134 M, 138; 148/121, 148/120, 122, 31.55

[56] References Cited

U.S. PATENT DOCUMENTS

| | | | |
|---|---|---|---|
| 3,116,181 | 12/1963 | Hokkeling et al. | 75/134 M |
| 3,390,443 | 7/1968 | Gould et al. | 148/121 |
| 3,661,567 | 5/1972 | Yamamoto | 75/134 M |
| 3,730,784 | 5/1973 | Yamamoto | 75/134 M |

*Primary Examiner*—Walter R. Satterfield
*Attorney, Agent, or Firm*—Wenderoth, Lind & Ponack

[57] ABSTRACT

Magnetic alloys consisting of 68.0~73.0 weight % manganese, (1/10 Mn - 6.6)~($\frac{1}{3}$ Mn - 22.2) weight % carbon, the balance aluminum, which show wasp-waisted magnetic hysteresis loops with the ratio of the residual magnetization $4\pi I_r$ to the intensity of magnetization $4\pi I_{10000}$ in a magnetic field of 10000 Oe, $I_r/I_{10000}$, falling 0.0~0.2.

3 Claims, 1 Drawing Figure

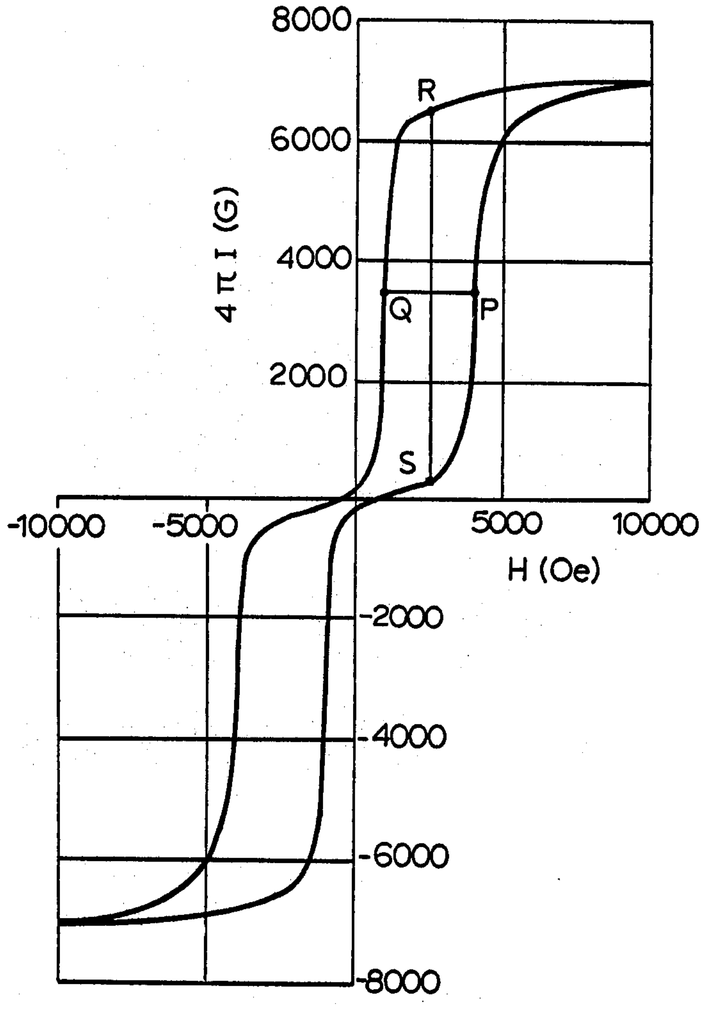
8000
6000
4000
2000
-2000
-4000
-6000
-8000
4 π I (G)
-10000
-5000
5000
10000
H (Oe)
R
Q
P
S

MAGNETIC ALLOYS HAVING WASP-WAISTED MAGNETIC HYSTERESIS LOOP

BACKGROUND OF THE INVENTION

The present invention relates to magnetic alloys of manganese-aluminum-carbon (Mn-Al-C) which show wasp-waisted hysteresis loops.

The conventional alloys of Mn-Al-C were disclosed, for example, in U.S. Pat. No. 3,661,567, etc., and have been put to practical uses as permanent magnets having excellent magnetic characteristics. Their magnetization curves represent a residual magnitization $4\pi I_r$( = Br) of about 3000 G, coercive force $\beta$Hc of about 15000 Oe and the ratio of $4\pi I_r$ to the intensity of magnetization in the magnetic field of 10000 Oe, $I_r/I_{10000}$, of higher than 0.5, which are all high enough to give the magnetic hysteresis loops of ordinary permanent magnets.

On the other hand, the magnetic alloys of Mn-Al-C of this invention give magnetic hysteresis loops of the shape shown in the accompanying graph which is entirely different from the shape of the aforementioned magnetic hysteresis loops of permanent magnets. This is the so-called wasp-waisted magnetic hysteresis loop, being a special magnetic hysteresis loop representing low values of $4\pi I_r$ and $I_r/I_{10000}$, which shows magnetic hysteresis mainly in the first quadrant and the third quadrant. These magnetic alloys virtually have no magnetic characteristics of permanent magnets, and have quite different usages from those of permanent magnets.

The magnetic hysteresis loop called wasp-waisted type, as shown, for example, in R. M. Bozorth, "Ferromagnetism" (1961), on pages 125 and 173, is hitherto known to appear in the process of cold working of such soft magnetic materials as Permalloys, Perminvars. Its shape is like that of the hysteresis loops of ordinary soft magnetic materials deflected to the first quadrant and to the third quadrant, with the two deflected hysteresis loops being joined to each other through a narrow or nearly straight-line part. In the magnetic materials having this characteristic, as the magnetic field is increased from zero, the permeability abruptly rises in a certain magnetic field, with the intensity of magnetization approaching $4\pi I_s$; thereafter, as the magnetic field is conversely reduced, $4\pi I$ initially diminishes gradually, and then, abruptly falls down, before the magnetic field reaches zero, so that a magnetic hysteresis loop may be drawn within the first quadrant. Accordingly, $4\pi I_r$ takes a very low value, and $I_rI_s$ also assumes a very small value. Magnetic materials which show such wasp-waisted magnetic hysteresis loops are used for current limiters by utilizing the appreciable change of permeability in varied magnetic fields, or their applications as magnetic memories based on the utilization of this magnetic hysteresis loop have been devised.

SUMMARY OF THE INVENTION

The present invention provides magnetic alloys of manganese-aluminum-carbon which show excellent wasp-waisted magnetic hysteresis loops representing $I_r/I_{10000}$ of 0.0~0.2, the ratio of the residual magnetization, $4\pi I_r$, to the intensity of magnetization in the magnetic field of 10000 Oe, $4\pi I_{10000}$, and a manufacturing method of such alloys.

For magnetic alloys of Mn-Al-C of this invention, the magnetic field required for achieving the saturation magnetization runs as high as above several hundred Oe, as compared with those for conventional materials which fall within several tens Oe. Accordingly, the magnetic alloys of this invention, if utilized for current limiters, will make it possible to control such large currents as hitherto unmanageable, and their use as magnetic memories is feasible.

BRIEF DESCRIPTION OF THE DRAWING

The accompanying drawing depects a graph showing the wasp-waisted magnetic hysteresis loop of the magnetic alloys of this invention.

DESCRIPTION OF THE PREFERRED EMBODIMENT

The manufacturing method of conventional Mn-Al-C alloys is as described hereunder, as per U.S. Pat. No. 3,661,567:

The material mixed in a proportion falling within the ranges of Mn69.5~73.0 weight % (hereinafter simply indicated by %), Al26.4~29.5% and carbon 0.6~(1/3 Mn-22.2)%, is melted by heating it above 1380° C but below 1500° C, thereby forcibly dissolving carbon, and then, the molten metal is cast. The ignot thus obtained, after being homogenized by heating it above 900° C, is quenched by abruptly cooling it from the temperature of higher than 900° C down to lower than 600° C at a rate higher than 300° C/min, to forcibly dissolve carbon, thereby forming a nonmagnetic alloy of the hexagonal crystal structure phase, and then, this alloy is further subjected to tempering treatment for an appropriate period of time at a temperature of 480° C~650° C, to transform it into an alloy of the tetragonal crystal structure phase, being the magnetic phase. The Mn-Al-C alloy magnet manufactured by this method has a magnetic characteristic of $(BH)_{max} = 1.0 \times 10^6$ G.Oe.

On the other hand, the Mn-Al-C magnetic alloys of this invention have been obtained on the basis of the discovery of a new phenomenon that as they are transformed from the hexagonal phase into the tetragonal phase under the influence of an anisotropic stress, the magnetic hysteresis loops of these alloys turn into the wasp-waisted type. The manufacturing method is as follows: An alloy with its composition ranges falling Mn 68.0~73.0%, carbon (1/10 Mn -6.6)~(1/3 Mn -22.2) %, the balance Al, is prepared by casting the molten metal, and is then, quenched from a temperature higher than 900° C at a cooling rate higher than 300° C/min, thereby forming an alloy of the hexagonal phase. Or after being homogenized by heating it at a temperature higher than 900° C, the alloy is gradually cooled at a rate of lower than 10° C/min in the temperature range above 830° C but below 900° C, and thereafter, is quenched from this temperature range, or it is held for more than 7 minutes in the temperature range above 830° C but below 900° C, and then, is quenched from this temperature range, to obtain an alloy in which the (hexagonal crystal structure + lamellar $Mn_3AlC$) phase is formed by precipitating $Mn_3AlC$ in the shape of lamellae on the (0001) plane of the hexagonal crystal structure. These alloys are, then, transformed into those of the tetragonal crystal structure phase or the (tetragonal crystal structure + lamellar $Mn_3AlC$) phase by tempering them at a temperature of 530~750° C under the influence of an anisotropic stress. The designation of the heat treatment for precipitating the lamellae of $Mn_3AlC$ on the (0001) plane of the hexagonal crystal structure, as described above, is abbreviated as M treatment.

The magnetic alloys of Mn-Al-C obtained by these manufacturing methods show excellent wasp-waisted magnetic hysteresis loops representing the values of $I_r/I_{10000}$ of 0.0~0.2.

EXAMPLE 1

A single crystal of the hexagonal crystal structure phase of an Mn-Al-C alloy having a composition of Mn 72.11%, Al 26.86% and C 1.04%, as chemically analyzed, was formed. This single crystal of the hexagonal phase was formed by heating the Mn-Al-C alloy at a temperature above its melting point 1400° C to be melted, then, solidifying the molten metal from one end thereof by the Bridgman method, a conventional method of forming single crystals, and furthermore, holding it at 1150° C for 2 hours to homogenize it and, thereafter, quenching it from this temperature at a cooling rate of higher than 300° C/min. From the single crystal of about 30mm diameter, an 8 mm square cubic test piece to be pressured was so cut out as to have 3 faces (a), (b) and (c) making a right angle to each other;

a. a face perpendicular to the pressuring direction,
b. a face parallel to the crystal face containing the pressuring direction and the axial direction [0001] of the hexagonal crystal, and
c. a face making right angles to (a) and (b). This test piece was tempered for 20 minutes, while applying a pressure of 30 kg/mm² at a temperature of 550° C on an oil-hydraulic press machine in the direction indicated by the angles of $\theta_1 = 50°$ and $\theta_2 = 0°$. By way of this tempering process under the influence of the stress, the crystal phase was transformed into the tetragonal phase. The pressuring direction mentioned above is defined by the angles of $\theta_1$ and $\theta_2$, $\theta_1$ indicating the angle made by the pressuring direction and the axial direction [0001] of the hexagonal crystal, and $\theta_2$ the angle made by the projected axis of the pressuring direction on the (0001) plane and the axial direction [1$\bar{1}$00]. $\theta_1$ and $\theta_2$ were so chosen as to fall within the angle ranges of $0° \leqq \theta_1$ 90° and $0° \leqq \theta_2 \leqq 30°$, taking into consideration the symmetry of the hexagonal crystal. All the pressuring directions which go outside the angle ranges mentioned above may be substituted by the pressuring direction which falls within the aforementioned angle ranges because of the symmetry of the hexagonal crystal.

The shape of the test piece after undergoing the tempering process under the influence of the stress is nearly rectangular prism of 6.8 × 9.2 × 8.1 mm. In this test piece, as compared with its shape before the treatment, a shrinkage was recognized in the pressuring direction, and a notable elongation in the direction corresponding to the direction being perpendicular to the pressuring direction and being parallel to the plane containing the [0001] axis of the test piece before undergoing the process and the pressuring direction, while barely an elongation was observed in another direction mutually at right angles to these two directions, thus giving evidence of anisotropy in elongation in the directions perpendicular to the pressuring direction.

As the magnetic hysteresis loops were measured with this test piece in the aforementioned three directions i.e., the pressuring direction, the direction at a right angle thereto where its elongation was notable and the direction also at a right angle thereto where its elongation barely occurred, the wasp-waisted magnetic hysteresis loop shown by the graph was obtained in the direction where the elongation was notable. The magnetic characteristics were found out to be:

$$4\pi I_{10000} = 6950\ G,$$
$$4\pi I_r = 200\ G,$$
$$I_r/I10000 = 0.03,$$

and $$I_d/2I_r = 15.5.$$

where $I_d$ was determined from the equation of $I_d = [4\pi I(R) - 4\pi I(S)]/4\pi$, with the points on the magnetic hysteresis loop which give a value ½ of $4\pi I_{10000}$, as shown in the graph, represented by P and Q, and the intersecting points between the perpendicular bisector of the straight line PQ and the magnetic hysteresis loop by R and S, and assuming the intensities of magnetization at the points R and S respectively to be $4\pi I(R)$ and $4\pi I(S)$, and $I_d/2I_r$ was written as indicating the degree of the magnetic hysteresis in the first quadrant of the wasp-waisted magnetic hysteresis loop. Accordingly, the larger the value of $I_d/2I_r$, the more excellent is the wasp-waisted hysteresis loop, this value being in reality desired to be higher than 2, while the more excellent magnetic hysteresis loop is obtained at the smaller value of $I_r/I_{10000}$, desirably lower than 0.2 in reality.

The magnetic hysteresis loops in the two directions, i.e., the pressuring direction and the direction where barely a deformation occurred, both were found to be not the wasp-waisted magnetic hysteresis loops, being nearly straight line in shape representing $4\pi I_{10000} =$ 1900 G and $4\pi I_r \simeq 0$ G and showing almost no magnetic hysteresis.

Then, with single crystals of the hexagonal phase formed by different methods, the similar experiments as that described above were conducted. The chill mold method with the solidification made from one end and the recrystallization method in which the test piece is held for more than 12 hours at a temperature higher than 1100° C but lower than its melting point were tried as the forming methods. By whichever method, polycrystals of large grain sizes were obtained, and from them, 3 ~ 5 mm square cubic test pieces of single crystals of the hexagonal phase could be cut out. As the experiments of transformation under the influence of the stress were carried out with these test pieces in the similar manner as described previously, the graphs obtained showed the wasp-waisted magnetic hysteresis loops.

EXAMPLE 2

A single crystal of the hexagonal phase having a composition of Mn72.05%, Al 26.85% and C 1.10%, as chemically analyzed, was formed in the similar way as in Example 1, and after undergoing the M treatment of holding at 830° C for 30 minutes, this single crystal was quenched from this temperature at a cooling rate of higher than 300° C/min. The test piece after being quenched was found to be a single crystal of the hexagonal phase containing the lamellae of $Mn_3AlC$, with $Mn_3AlC$ precipitated on the (0001) plane of the hexagonal crystal in the shape of lamellae, as observed under an optical microscope and analyzed by the X-ray diffraction.

As the 10 mm square cubic test piece cut out from the single crystal of the (hexagonal crystal + lamellar $Mn_3AlC$) phase was subjected to the treatment of the tempering under the influence of the stress in the similar manner as in Example 1, a magnetic alloy obtained had the same shape of the test piece as that of Example 1 and gave the wasp-waisted hysteresis loop in the direction where the elongation was notable superior to that of Example 1. Its magnetic characteristics were found to be:

$4\pi I_{10000} = 6900\ G,$
$4\pi I_r = 100\ G,$
$I_r/I_{10000} = 0.01,$ and $I_d/21_r = 28.5.$

EXAMPLE 3

A single crystal of the hexagonal phase having a composition of Mn 71.95%, Al 27.07% and C 0.98%, as chemically analyzed, was formed in the similar manner as in Example 1, and the test piece cut out from this single crystal was subjected to the treatment of the tempering under the influence of the stress, with such conditions as the tempering temperature, etc., varied. The result showed that the period of time of tempering suitable for obtaining the excellent wasp-waisted magnetic hysteresis loop differs, depending on the tempering temperature e.g., the period of time required at 530° C was 60 minutes, and at 750° C 2 minutes, showing the tendency of shortened time with rising temperature.

In Table 1, the values of $4\pi I_{10000}$, $I_r/I_{10000}$ and $I_d/21_r$ obtained when the test pieces were subjected to the treatment of the tempering under the influence of the stress, with the temperature varied and held for the periods of time suitable to the respective temperatures, while applying the pressure of 30 kg/mm² in the direction of $\theta_1 = 50°$ and $\theta_2 = 0°$, are shown. Because the magnetic hysteresis loop having its Q point in the second quadrant of the graph is not of the wasp-waisted form, however, the value of $I_d/2I_r$ was not listed.

As the tempering temperature was varied, within the temperature range of 530°~750° C, the graphs showed excellent wasp-waisted hystereses loops representing the values of $I_r/I_{10000}$ of smaller than 0.1 and the values of $I_d/2I_r$ of larger than 4, and especially, within the temperature range of 530°~670° C, very excellent wasp-waisted magnetic hysteresis loops representing the values of $I_r/I_{10000}$ of less than 0.03 and the values of $I_d/2I_r$ of more than 10. At temperatures lower than 500° C, the value of $I_r/_{10000}$ was larger than 0.3, and the value of $4\pi I_{10000}$ ran low, while at temperatures higher than 800° C, the wasp-waisted magnetic hysteresis loop was not obtained.

Table 1

| Tempering temperature (° C) | $4\pi I_{10000}$(G) | $I_r/I_{10000}$ | $I_d/2I_r$ |
|---|---|---|---|
| 500 | 3300 | 0.37 | 1.1 |
| 530 | 6850 | 0.03 | 13.0 |
| 600 | 6850 | 0.02 | 18.7 |
| 670 | 6700 | 0.03 | 11.5 |
| 750 | 6200 | 0.09 | 4.2 |
| 800 | 5750 | 0.78 | — |

Then, the test pieces were subjected to the treatment of the tempering under the influence of the stress at 550° C for 20 minutes, by changing the pressure within the range of 10~60 kg/mm² in the direction of $\theta_1 = 50°$ and $\theta_2 = 0°$. The result was that within the pressure range of 15~50 kg/mm², wasp-waisted hysteresis loops representing the values of $I_r/I_s$ of smaller than 0.2 and the values of $I_d/2I_r$ larger than 2 were obtained, but at pressures lower than 10 kg/mm² and pressures higher than 60 kg/mm², the wasp-waisted hysteresis loops were not achieved.

In the next place, the test pieces were subjected to the treatment of the tempering under the influence of the stress at a temperature of 550° C and for a period of time of 30 minutes, with a pressure of 30 kg/mm² applied in varied directions. When the pressuring direction fell within the angle ranges of $35° \leqq \theta_1 \leqq 70°$ and $0° \leqq \theta_2 \leqq 15°$, wasp-waisted magnetic hysteresis loops representing the values of $I_r/I_{10000}$ of less than 0.2 and the values of $I_d/2I_r$ of more than 2 were obtained, but when the pressuring direction was beyond the limits of angles mentioned above, the value of $I_r/I_{10000}$ ran above 0.3, giving only magnetic hysteresis loops which showed slight separations or those which were not of the wasp-waisted form.

Furthermore, the single crystal test pieces of hexagonal phase containing the lamellae of $Mn_3AlC$ which had been subjected to the M treatment of Example 2 were subjected to the treatment of the tempering under the influence of the stress, with such conditions as tempering temperature varied similarly as in the case described above. The result was that with these test pieces also, when the tempering temperature fell within the range of 530°~750° C, the pressure within the range of 15~50 kg/mm², and the pressuring direction $35° \leqq \theta_1 \leqq 70°$ and $0° \leqq \theta_2 \leqq 15°$, respectively, wasp-waisted magnetic hysteresis loops representing the values of $I_r/I_{10000}$ of less than 0.2 and the values of $I_d/2I_r$ of more than 2 were obtained. When the comparison of the values of $I_r/I_{10000}$ was made between test pieces containing the lamellae of $Mn_3AlC$ and the aforementioned test pieces not containing them, the tendency was recognized that the test pieces containing the lamellae of $Mn_3AlC$ give rather smaller values, and are a bit superior in separation.

EXAMPLE 4

Single crystal test specimens of hexagonal phase of Mn-Al-C alloys having different compositions of Mn, Al and C were formed by the similar method as that of Example 1, and these test specimens were subjected to the tempering under the influence of the stress for 1~60 minutes by applying thereon a pressure of 15~50 kg/mm² at a temperature of 530°~670° C in the direction of $\theta_1 = 50°$ and $\theta_2 = 0°$. The results obtained were as follows:

In Table 2, the compositions determined by chemical-analysis and the values of $4\pi I_{10000}$, $I_r/I_{10000}$ and $I_d/2I_r$ are respectively listed. With Mn-Al-C alloys with their compositions falling within the ranges of Mn 68.0~73.0%, C(1/10 Mn - 6.6 ) ~ (⅓ Mn - 22.2)%, the balance Al, the test specimens underwent changes in shape due to the transformation under the stress -, and particularly, the anisotropic elongation was recognized in the directions at right angles to the pressuring direction. These test pieces all showed excellent wasp-waisted hysteresis loops representing the values of $I_r/I_{10000}$ of less than 0.2 and the values of $I_d/2I_r$ of more than 2 in the direction where the elongation was notable. Especially with alloys with their compositions falling within the ranges of Mn 70.0~72.2% , C(1/10 Mn - 6.6 )~(⅓ Mn - 22.2)%, the balance Al, very excellent magnetic wasp-waisted hysteresis loops representing the values of $I_r/I_{10000}$ of less than 0.05 and the values of $I_d/2I_r$ of more than 8 were obtained.

On the other hand, it was confirmed through observations of optical microscopy and by way of the X-ray diffraction that there existed in abundance the $\beta$-Mn phase in alloys with Mn more than 73.0% and the AlMn(r) phase in alloys with Mn less than 68.0%, respectively, and large amounts of the [$\beta$-Mn + AlMn(r)] phase existed in alloys with C less than (1/10 Mn - 6.6)%.

Accordingly, all of these alloys gave such low values of $4\pi I_{10000}$ as less than 3000 G, and showed no wasp-waisted hysteresis loops. In alloys with C more than ($\frac{1}{3}$ Mn - 22.2)%, the precipitation of $Al_4C_3$ was observed under an optical microscope. Since $Al_4C_3$ undergoes hydrolysis in the presence of moisture, the phenomenon of decay was recognized in alloys containing $Al_4C_3$.

Furthermore, with alloys of such compositions that the wasp-waisted hysteresis loops were not obtained, the graphs failed to show the wasp-waisted hysteresis loops even when they were subjected to the tempering under the influence of the stress, with the pressuring direction varied.

Then, single crystal test pieces having compositions determined by chemical analysis of Table 2 which had been subjected to the M treatment were tempered under the influence of the stress similarly as in the previous case. The results obtained were nearly the same as those listed on Table 2. Thus, wasp-waisted hysteresis loops representing the values of $I_r/I_{10000}$ of less than 0.2 and the values of $I_d/2I_r$ of more than 2 were obtained with alloys of compositions falling within the ranges of Mn 68.0~73.0%, C(1/10 Mn - 6.6)~($\frac{1}{3}$ Mn - 22.2) %, the balance Al.

Table 2

| Composition determined by chemical analysis | | | Magnetic characteristics | | |
|---|---|---|---|---|---|
| Mn (%) | Al (%) | C (%) | $4\pi I_{10000}$(G) | $I_r/I_{10000}$ | $I_d/2I_r$ |
| 72.02 | 27.43 | 0.55 | 2000 | 0.53 | — |
| 69.77 | 30.04 | 0.19 | 1400 | 0.51 | — |
| 73.44 | 25.53 | 1.03 | 2700 | 0.66 | — |
| 72.89 | 25.86 | 1.25 | 6150 | 0.08 | 5.5 |
| 72.16 | 26.64 | 1.20 | 6800 | 0.03 | 14.0 |
| 70.03 | 29.04 | 0.93 | 6900 | 0.05 | 8.1 |
| 68.14 | 31.41 | 0.45 | 5800 | 0.15 | 2.9 |
| 67.63 | 32.17 | 0.20 | 2550 | 0.50 | — |
| 70.78 | 27.77 | 1.45 | 4400 | 0.65 | — |
| 69.90 | 28.77 | 1.33 | 4200 | 0.70 | — |

The examples described hereabove clarified the fact that when single crystals of the hexagonal structure or those of the hexagonal structure containing lamellae of $Mn_3AlC$ of Mn-Al-C alloys with their compositions falling within the ranges of Mn 68.0~73.0%, C(1/10 Mn - 6.6)~($\frac{1}{3}$ Mn - 22.2 )%, the balance Al are tempered under the influence of the stresses at temperatures of 530~750° C, the graphs of their magnetic characteristics obtained with them show excellent wasp-waisted magnetic hysteresis loops representing the values of $I_r/I_{10000}$ of 0.0~0.2 and the values of $I_d/2I_r$ of larger than 2.

Furthermore, polycrystalline bars of Mn-Al-C alloys composed of hexagonal phase or hexagonal phase containing lamellae of $Mn_3AlC$ of the above mentioned composition ranges were tempered under the influence of the stress at temperatures falling within the above mentioned temperature ranges, while applying tensile stresses on these bars in their axial direction. Then, it was made evident that wasp-waisted magnetic hysteresis loops representing the values of $I_r/I_{10000}$ of 0.1~0.2 and the values of $I_d/2I_r$ of 2~4 are obtained in the axial direction of the bars, and that even with polycrystals, the wasp-waisted magnetic hysteresis loops are achieved by the treatments of the tempering under the influence of the stress such as various kinds of plastic deformation with transformation.

Further still, the measurements of magnetic hysteresis loops conducted with test pieces in thin sheets of 50 $\mu$ thickness which were cut off from the alloys tempered under the influence of the stress as in Example 1 and with test pieces in thin sheets of about 10 $\mu$ thickness each of which was formed by stripping the surface of the alloy tempered under the influence of stress of Example 2 corresponding to the (0001) plane, as defined before it was tempered, all gave wasp-waisted hysteresis loops representing the values of $I_r/I_{10000}$ of smaller than 0.2 and the values of $I_d/2I_r$ of larger than 2.

What we claim is:

1. A worked and heat-treated alloy product having a wasp-waisted magnetic hysteresis loop prepared by tempering an alloy composition consisting essentially of 68.0 to 73.0% by weight of manganese, (1/10 Mn - 6.6)% to ($\frac{1}{3}$ Mn - 22.2)% by weight of carbon and the remainder aluminum, said alloy having a hexagonal crystalline structure, at a temperature of from 530° to 750° C under an anisotropic stress of from 15 to 50 kg/mm² until the hexagonal crystalline structure of the alloy is transformed into a tetragonal crystalline structure; said alloy product thus-prepared, exhibiting a magnetic hysteresis loop in a wasp-waisted form such that the $4\pi I_{10000}$ value is at least 5800 G wherein $4\pi I_{10000}$ represents the intensity of magnetization in a magnetizing force of 10000 Oe and such that the value of the ratio $Id/2Ir$ is more than 2 wherein $Id$ represents the value of $[4\pi I(R) - 4\pi I(S)]/4\pi$; $4\pi I(R)$ and $4\pi I(S)$ represent the intensity of magnetization at the intersecting points R and S of the wasp-waisted hysteresis loop and the perpendicular bisector of the line PQ, respectively as shown in the graph of the drawing; P and Q each represent points which give a half value of $4\pi I_{10000}$ and $Ir$ represents the residual magnetization divided by $4\pi$.

2. A product of an alloy having a wasp-waisted magnetic hysteresis loop according to claim 1, wherein the alloy composition consists essentially of 70.0 to 72.2% by weight of manganese, (1/10 Mn - 6.6)% to ($\frac{1}{3}$ Mn - 22.2)% by weight of carbon and the remainder aluminum.

3. A product of an alloy having a wasp-waisted magnetic hysteresis loop according to claim 1, wherein the alloy contains lamellae of the compound $Mn_3AlC$.

* * * * *